United States Patent [19]

Venier

[11] Patent Number: 5,046,698
[45] Date of Patent: Sep. 10, 1991

[54] INTERLOCKING STRUCTURAL TRACK

[75] Inventor: Fabio Venier, Downsview, Canada

[73] Assignee: Magna International Inc., Markham, Canada

[21] Appl. No.: 352,731

[22] Filed: May 15, 1989

[51] Int. Cl.$^5$ .............................................. F16M 13/00
[52] U.S. Cl. ..................................... 248/430; 248/429
[58] Field of Search ................ 248/430, 429, 420, 631

[56] References Cited

U.S. PATENT DOCUMENTS

| | | | |
|---|---|---|---|
| 3,926,397 | 12/1975 | Hunwicks | 248/430 |
| 3,999,733 | 12/1976 | Harder, Jr. et al. | 248/631 |
| 4,533,107 | 8/1985 | Okazaki et al. | 248/430 |
| 4,756,503 | 7/1988 | Fujita | 248/430 |
| 4,776,551 | 10/1988 | Nishino | 248/430 |
| 4,821,991 | 4/1989 | Aihara et al. | 248/430 |

FOREIGN PATENT DOCUMENTS

| | | | |
|---|---|---|---|
| 3226585 | 1/1984 | Fed. Rep. of Germany | 248/429 |
| 0744918 | of 1933 | France | 248/429 |
| 0188727 | of 1983 | Japan | 248/429 |
| 0064839 | of 1988 | Japan | 248/430 |
| 0441393 | of 1936 | United Kingdom | 248/429 |

Primary Examiner—David L. Talbott
Assistant Examiner—Daniel Hulseberg
Attorney, Agent, or Firm—Neil H. Hughes; Ivor M. Hughes

[57] ABSTRACT

A track assembly including a fixed track engaged with a movable track slidable with respect to the fixed track, the movable track having disposed therewith anchoring portions for securing a load to the moveable track, the fixed track having first and second engaging portions disposed integrally therewith, the moveable track having third and fourth engaging portions disposed integrally therewith for interengagement with the first engaging portions of the fixed track disposed substantially between the third and fourth engaging portions of the moveable track, the first and second engaging portions of the fixed track for interengagement with the third engaging portion of the moveable track disposed substantially between the first and second engaging portions of the fixed track; whereby when a force is exerted upon the track assembly through the anchoring portions in a direction tending to separate the tracks, the second engaging portion of the fixed track will engage the third engaging portion of the moveable track causing the third engaging portion to collapse towards the fourth engaging portion thus interlocking the first engaging portion therebetween and resisting the force tending to separate the tracks.

22 Claims, 5 Drawing Sheets

FIG. 7A

INTERLOCKING STRUCTURAL TRACK

FIELD OF THE INVENTION

This invention relates to structural tracks for motor vehicles and the like which when subjected to a load through the seat belt mechanism resists separation of the track assembly.

BACKGROUND OF THE INVENTION

A multiplicity of seat belt structures exists in the prior art. Standards for loading have been established by among others the Federal Motor Vehicle Safety Standard, and specifically in 49 C.F.R. Chapter 5, Section 571.207, Standard No. 207, and Section 571.210, Standard No. 210 seat belt assembly anchorages. Within each of these aforementioned standards there is described a test procedure outlining the applicable forces which must be sustained and the center line or contact point of those forces as well as the duration of the application of such forces. In reviewing the prior art in seat related track structures, there appears to be a lack in the prior art wherein the upper and lower tracks when subjected to such loaded tests do not interact nor interengage, but have a general tendency to separate from one another. Such a separation under normal seat belt loading may very well have disastrous consequences to the operator of the vehicle. A significant number of track profiles have been tested and loaded to determine the deficiencies in the prior art in an attempt to access the cause of the separation of these well known track profiles.

Before a track assembly can be well received in the marketplace it must be well designed, easy to manufacture, with a high level of beam stiffness or a section modulus. It would also be very desirable for the track to promote interlocking between the upper and lower rails during the loading process. Another beneficial attribute of such a track would be that it would be light weight requiring less material while remaining superior in performance.

In conducting the standard tests described above, typically the upper rail is subjected to a peeling load through the seat belt anchor when in its various adjusted positions and the track must withstand the predetermined maximum load for a predetermined period of time. In relating this test to the prior art, referring now to the European Patent Application 98,740 of TI Cox Limited and published in 1984 a double J profile is illustrated and described. The upper track has a general double J, one of the J's being a mere image of the other, the upper track being inserted in a lower track having a general U-shape and having inwardly extending appendages which extend towards the larger upwardly extending portion of each of the J portions.

U.S. Pat. No. 4,564,236 issued on Jan. 14, 1986 in favour of Keiper Recaro GmbH & Co., also describes a double J track of alternative formation wherein the inwardly extending appendages of the generally U-shaped fixed track extend down toward the bottom of the double J portions at substantially 90°. These tracks have been tested for their interlocking abilities and it has been determined that when subjected to a sufficient load, the upwardly extending shorter portions of each J tend to press against the bending portion of the adjacent surfaces of the bottom track and tend to open up the bottom track providing a minimum of interrelationship during the loading of the track. In conclusion, this profile does not tend to interlock when subjected to a sufficient load, but tends to separate. This track assembly therefore restrains occupants by the material strength of the flanges of both the upper and lower tracks. It is customary therefore to form these tracks from thicker gauge metal.

Another form of track profile available in the prior art is found in U.S. Pat. No. 3,926,397 wherein is described and illustrated a generally U-shaped stationary track having engaged therewith a generally C-shaped track as the moveable track. Again when subjected to a load the top track will tend to open up, thus resulting a separation of the track portions during extreme loading compensated again by the thickness of material. U.S. Pat. No. 4,487,459 describes a similar type device which will again tend to separate and open up with respect to one another during the loading.

U.S. Pat. No. 4,422,612 describes a moveable and fixed rail which is extruded from aluminum and which has a set of two tab portions on the moveable rail and a set of tab portions on the fixed rail. The bottom set interengage or lock with teeth during normal operation, but again when subjected to a load would only withstand the load according to the material strength of the tab portions 13 and 6. These portions will interengage during normal use, but do not tend to bind down upon each other when subjected to loads. In fact, the teeth may shear as seen in FIG. 3, and thus provide a considerable amount of play in the track during loading. There is no provision for the collapsing of one track around another and the interlocking aspects thereof.

Finally, U.S. Pat. No. 4,262,963 describes a guide rail assembly which is very complex and a good example of involved profiles found in the prior art. When subjected to loading, there is not found in the description of the invention in the U.S. Pat. No. 4,262,963 any aspect of collapsing or interlocking which would be highly desirable in performance of a structural track.

Nowhere within the prior art is there found a structural track assembly which when subjected to a peeling load from the seat belt anchor (attached to the moveable rail) will interlock with respect to one another because of the nature of the profile of the moveable track in relation to the fixed track, thus enhancing the performance of the track assembly. It is to this end which the instant invention addresses itself.

It is therefore an object of this invention to overcome the deficiencies in the prior art described above and provide a structural seat track which will interlock when subjected to separating loads.

It is a further object of this invention to provide a seat track structure which is easy to manufacture and economical.

It is a further object of this invention to provide a seat track which improves the safety performance of known prior art seat tracks.

Further and other objects of the invention will become apparent to a man skilled in the art when considering the following summary of the invention and the more detailed description of the preferred embodiments illustrated herein.

SUMMARY OF THE INVENTION

According to one aspect of the invention there is provided a track assembly comprising a fixed track engaged with a moveable track slidable with respect to the fixed track, the moveable track having disposed therewith anchoring means for securing a load to the moveable track, the fixed track having first and second engaging portions disposed integrally therewith, the moveable track having third and fourth engaging portions disposed integrally therewith for interengagement with the first engaging portions of the fixed track disposed substantially between the third and fourth engaging portions of the moveable track, the first and second engaging portions of the fixed track for interengagement with the third engaging portion of the moveable track disposed substantially between the first and second engaging portions of the fixed track; whereby when a force is exerted upon the track assembly through the anchoring means in a direction attending to separate the tracks, the second engaging portion of the fixed track will engage the third engaging portion of the moveable track causing the third engaging portion to collapse toward the fourth engaging portion, thus interlocking the first engaging portion therebetween and resisting the force tending to separate the tracks.

According to yet another aspect of the invention, the track assembly may further comprise bearing means disposed between the fixed and moveable track between the second and third portions of the track assembly to assist in the collapse of the third portion toward the fourth portion when the track assembly is subjected to a force tending to separate the track assembly, normally the bearing means assisting movement of the moveable track engaged with the fixed track. In a preferred embodiment of the invention, the bearing means is retained between the fixed and moveable tracks by cooperative stop means disposed with the moveable and/or a fixed track. The stop means may further comprise raised portions integrally formed with the moveable and/or fixed track. In a preferred embodiment of the invention, the bearing means may further comprise nylon rod disposed between ball bearings.

According to yet another aspect of the invention, there is provided a track assembly comprising a fixed track having two sides engaged with a moveable track slidable with respect to the fixed track, the moveable track having disposed therewith anchoring means for securing a passenger to the moveable track, the fixed track being substantially U-shaped in cross-section and having first and second engaging portions disposed therewith intermediate each side of the fixed track and extending in a direction preferably substantially co-planar to each other and towards the moveable track proximate the opening of the U-shaped cross-section, the moveable track being of substantially double J form in cross-section, one of the J structures being a mirror image of the other, each J structure having a smaller leg and a larger leg and having third and fourth engaging portions disposed therewith for each J-shaped structure, each third portion being an extension of the smaller leg extending toward the larger leg and each fourth portion being the bottom of each J-shaped structure, the engaging portions for interengagement with each first engaging portion of the U-shaped fixed track disposed substantially between each third and fourth engaging portions of the double J-shaped moveable track, each first and second engaging portions of the fixed track for interengagement with each third engaging portion of the moveable track disposed substantially between each first and second engaging portions of the fixed track; whereby when a force is exerted upon the track assembly through the anchor means in a direction tending to separate the tracks, the second engaging portions of the fixed track will engage the third engaging portions of the moveable track causing the third engaging portions to collapse toward the fourth engaging portions, thus interlocking the first engaging portions therebetween and resisting the force tending to separate the tracks.

According to yet another aspect of the invention, the track assembly may comprise bearing means disposed between the fixed an moveable track between each second and third portions of the track assembly to assist in the collapse of the third portions toward the fourth portions when the track assembly is subjected to a force tending to separate the track assembly, normally the bearing means assisting movement of the moveable track engaged with the fixed track. In a preferred embodiment thereof the bearing means is retained between the fixed and the moveable tracks by cooperative stop means disposed with the moveable and/or fixed track. Preferably the stop means may further comprise raised portions integrally formed with the moveable and/or fixed track. In a preferred embodiment the bearing means may further comprise nylon rod disposed between ball bearings.

According to yet another aspect of the invention, the fixed and/or moveable track may be formed by conventional roll forming techniques.

According to yet another aspect of the invention, the track assembly may further comprise third portions having hooking portions disposed at the end thereof proximate the first portions, the hooking portions extending towards the first portions and for binding into the first portions when the third portion collapses towards the fourth portions when subjected to a force tending to separate the track assembly. In a preferred embodiment the third portion is disposed at a substantially 45° angle to the extension of the fourth portion. Preferably the hook portion is disposed at an angle greater than substantially 90° to the extension of the third portion.

According to yet another aspect of the invention the track assembly may further comprise resilient insert means extending longitudinally within the fixed track. In a preferred embodiment the resilient insert means further comprises openings in which roller means are contained to assist the movement of the moveable rail within the fixed rail. Preferably the roller means is at least one cylindrical roller. Preferably the resilient insert means is made from acetal sheet.

From the above summary of the invention, it can be readily seen that a track assembly has been provided which includes a fixed and moveable track interengaged having interlocking portions disposed therewith that behave in such a way as to collapse and interlock with one another when subjected to a load tending to separate the track assembly. By providing the necessary engagement portions in the cross-section or profile of the fixed and moveable tracks, this collapsing while engaged with one another is accomplished. By providing track profiles of a compatible nature to accomplish this purpose the collapsing enhances the structural integrity of the track assembly.

DETAILED DESCRIPTION OF THE DRAWINGS

Figures 1, 1A, 1B, 1C:
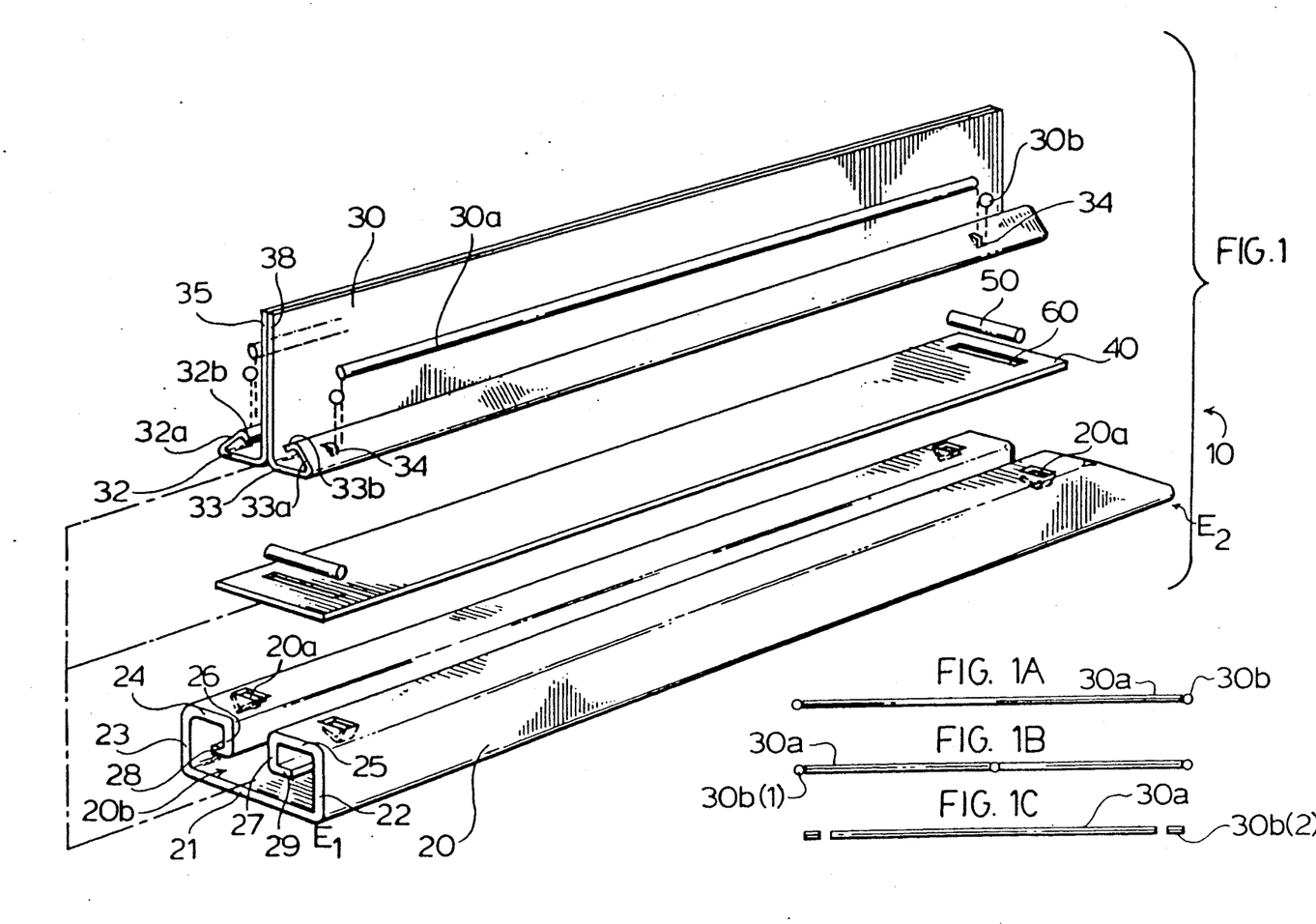
FIG. 1 is an exploded perspective view of the track assembly illustrating all the components thereof in a preferred embodiment of the invention.
FIGS. 1A, 1B, and 1C are schematic view of the bearing elements 30a of FIG. 1 illustrating some of the alternative embodiments of the invention.

Referring now to FIG. 1, there is illustrated a track assembly 10 shown in exploded perspective in order to illustrate the components of the track assembly 10. The track assembly has a lower fixed portion 20, the lower fixed portion 20 being fixed in position as a fixed track in a seat assembly in a conventional manner. The track 20 being of substantially rectangular shape, longitudinally and being of generally U-shaped in cross-section as best seen in relation to FIG. 3. Track 20 therefore has a bottom portion 21 of predetermined thickness approximately 2 mm and having upwardly extending portions 22 and 23 extending from the bottom 21 towards the top 24 and 25 of the lower fixed track 20. Portions 24 and 25 then extend inwardly toward one another and terminate to provide an opening 20b between the downwardly extending portions 26 and 27. At determination of the downwardly extending portions 26 and 27 there is disposed outwardly extending portions 28 and 29 which extend away from the opening 20b. As can be observed from the illustration in FIG. 1, the fixed track 20 is symmetrical about its longitudinal center line extending from end E1 to end E2. Downwardly extending portions 20a are formed the use of which will be in cooperation with portion 34 on the moveable track in order to retain the ball bearing 33b in position and prevent it from rolling off the ends of the track assembly. This structure will be described in more detail referring to FIG. 2.

Inserted within the opening 20b upon the top of portion 21 of the stationary track 20 is a resilient member 40 made from thermoplastic material and preferably acetal sheet Delrin which is a registered trademark of the Dupont Corporation. This material is tough and inexpensive. Roller portions 50 are disposed upon the bottom portion of the stationary rail 20 on the top of portion 21. The roller is of a predetermined diameter greater in dimension than the thickness of the resilient insert 40. The rollers are inserted in generally rectangular openings 60 at each end E1 and E2 of the resilient member. Thus, the moveable rail 30 will ride on the rollers 50 and not on the resilient member 40. The resilient member 40 is of generally rectangular shape, and spaces the rollers 50 at a predetermined location.

Figures 2, 3:
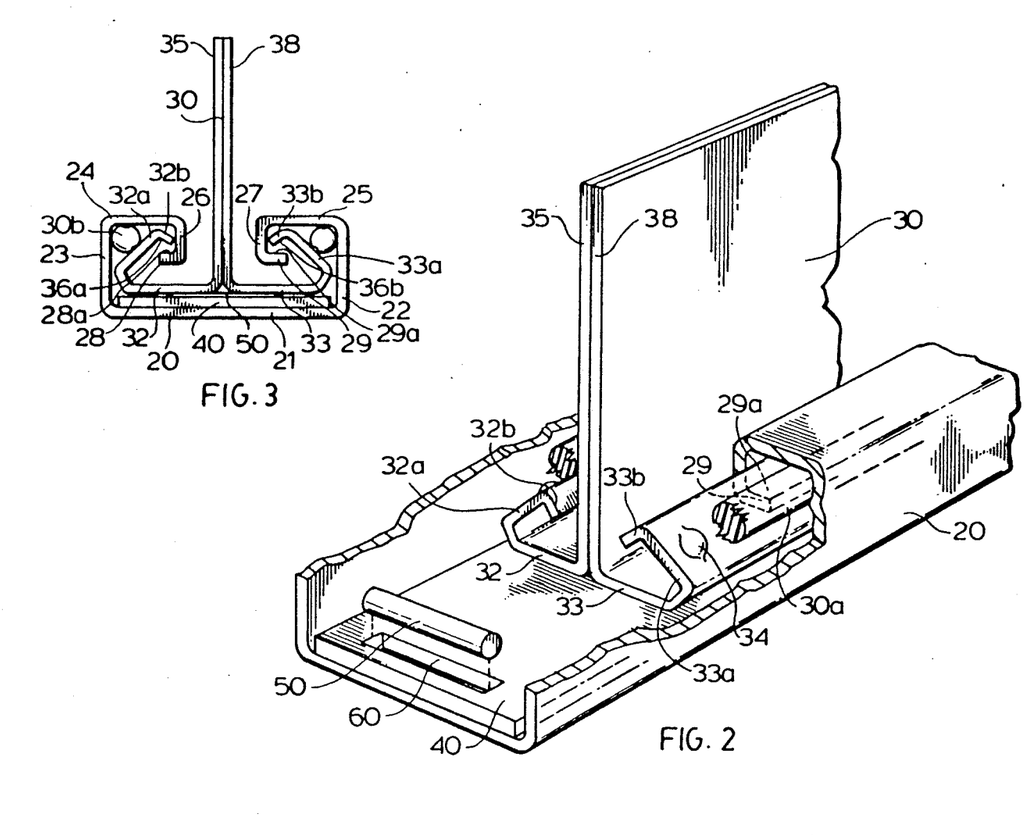
FIG. 2 is a partially cut away perspective view of the track assembly of FIG. 1 illustrating the interrelationship and fit of the components thereof in a preferred embodiment of the invention.
FIG. 3 is an end view of the track assembly of FIGS. 1 and 2 illustrating the interrelationship and interlocking aspects of the components thereof in a preferred embodiment of the invention.

A moveable track 30 is inserted within the opening 20b of the stationary track 20 when assembled. A moveable track is made up of two generally J-shaped portions 35 and 38 and being mirror images of one another and set back to back in forming the moveable track portion 30. This relationship is clearly visible in FIG. 3. Each generally J-shaped portion 35 and 38 has two ends, top and bottom. The top ends terminate at the top of the moveable track portion 30. The bottom end of each J portion has a substantially horizontally extending portion 32 and 33 extending laterally away from the larger upwardly extending portions of components 35 and 38. At the terminus of portions 32 and 33 as best seen in FIG. 3 there is provided arcuate portions meeting portions 32a and 33a which extend upwardly toward the side walls 22 and 23 of the fixed track but terminate short thereof and then extend inwardly at 32b and 33b towards the larger upwardly extending portions of each J figure. At the terminus of portions 33a and 32a there is formed downwardly and inwardly extending portions 32b and 33b. As can be clearly seen in FIG. 3, the moveable track portion 30 thus interfits with the stationary track portion 20 and has disposed therebetween a bearing surface 30a made from resilient material and having disposed proximate each end thereof E1 and E2 a ball bearing 30b being retained in position between preformed stops 34 disposed on the outside surface of member 33a and 32a and members 20a disposed on the moveable track on the top portion 25 and 24 thereof. Thus, when assembled the ball bearing acts as a bearing member and the resilient bearing surface 30a being of general cylindrical shape acts as a running surface. Thus, provision of the roller 50, the bearing surface 30a provides for smooth movement of the track in its normal use. The ball bearing 30b will be described hereinafter as a bearing member which assists when the track is subjected to a load tending to separate the tracks.

Referring now to FIGS. 1A, 1B and 1C there are illustrated the bearing surface 30a being of generally cylindrical shape having the ball bearings 30b disposed at each end in one alternative embodiment. This situation is illustrated in the member of FIG. 1A. The member of FIG. 1B illustrates a similar bearing surface 30a wherein three ball bearings 3b (1) are formed in the structure between two bearing members 30a. In the bottom illustration of FIG. 1C, cylindrical members 30b2 are provided the use of which will be hereinafter described as a bearing member in relation to the ball bearings 30b having exactly the same purpose of ball bearing 30b.

Referring now to FIGS. 2 and 3, there is illustrated the track assembly 10 when assembled including the lower fixed portion 20 and the moveable portion 30 riding on roller 50 within the fixed track. The bearing surface 30a is disposed between portion 33a and 32a and the terminus of portions 22 and 25 and 23 and 24 respectively disposed at the end of the bearing surface 30a are stops 34 and 20a which act to constrain the ball bearing 30b not illustrated in FIG. 2. The geometry of the track assembly 10 is best seen in relation to FIGS. 7 and 7a. The upper surface 29a of outwardly extending portion 29 as seen in FIG. 2 comes underneath the downwardly extending portion 33b of the moveable track 30. The interengagement of these two portions provides for an interlocking of the rails during normal use, wherein the surface 29a and the surface 36b are located proximate one another as is the surface 28a and the surface 36a. Therefore in normal use the double J track having downwardly extending portions 35 and 38, horizontally extending portions 32 and 33 and arcuate portions extending to inwardly and upwardly extending portions 32a and 33a and downwardly and inwardly extending portions 32b and 33b will move upon the resilient portion 40 upon rollers 50 within the opening 20b of the fixed track 20 which has a generally U-shape having a horizontal bottom 21 having upwardly extending members 22 and 23 extending from terminus of bottom portion 21 and having inwardly extending portions 24 and 25 extending at the terminus of portions 23 and 24 and then having downwardly extending portions 26 and 27 which extend inside of the portions 32b and 33b of the moveable track. At the terminus of the downwardly extending portions 26 and 27 there extends outwardly extending portions 28 and 29 which in effect capture the portions 32b and 33b on three sides. A ball bearing is disposed 30b on the outside surface of portions 32a and 33a respectively and on the inside portions of the terminating ends of 23 and 24 and 25 and 22 respectively. The ball bearing is situated so that any force exerted upon it will pass through its center. This effect will be hereinafter described in more detail, but generally provides for a smooth operation of the track through all its adjustment positions. Preferably the angles of 32a and 33a to the horizontal portion 32 and 33 is approximately 45°. By this angle being approximately 45° in the preferred embodiment the forces passing through the ball bearing during use of the seat and adjustment thereof will pass through its center and thus prevent it from rolling or slipping. More detail of this feature will be described further o in the detail description.

Figures 4, 5:
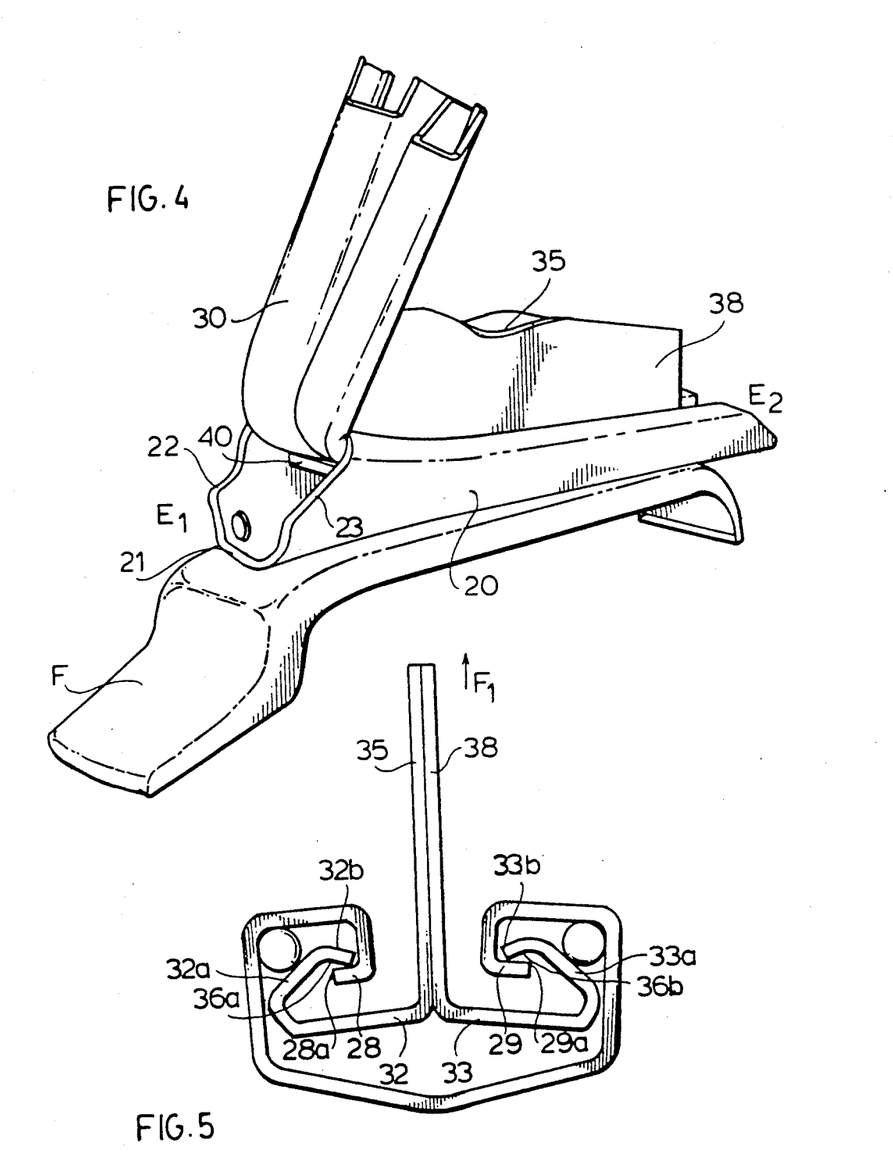
FIG. 4 is a perspective view of the track assembly of FIG. 1 and 2 when mounted on a vehicle frame and after having been subjected to a peeling load.
FIG. 5 is a cross-sectional view of the track assembly and the interlocking relationship thereof at end E1 when subjected to a separating load in a preferred embodiment of the invention.

Referring now to FIG. 4, there is illustrated a track assembly 10 of FIG. 1 when installed on the frame F of a vehicle seat. The track assembly has been subjected to a load when the moveable track 30 is not aligned with the lower track 20. For example, when used in a seat track assembly if the seat is in its fully rearward position a considerable percentage of the upper track will not be interengaged with the lower track, however, the seat back anchor not illustrated is normally attached to the upper track and moves with the upper track. In FIG. 4 the upper track has been subjected through the seat belt anchor to a peeling load tending to separate the upper and lower track through the ends E1 and E2, wherein the upper track is contained within the lower track. This situation occurs when the load from the seat belt is passed to the upper track which in turn attempts to pass it to the lower track. Thus, moveable track 30 is bent upwardly away from the fixed track 20 causing a predetermined amount of deformation in portions 22 and 23 and 21 at end E1 of the fixed track 20. As described in the background of the invention the tests for safety standard, a track must be able to endure a load of 3600 lbs. In testing the profiles of the instant invention considerably more success was achieved with 2 mm thick material making up the moveable and lower track. In fact, a load capability of 7200 lbs was obtained more than surpassing the load requirement of 3600 lbs described above.

Figure 6:
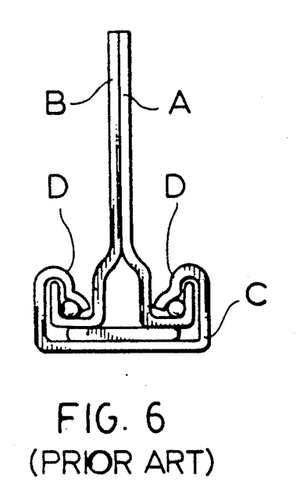
FIGS. 6 and 6a are illustrations of prior art track assemblies illustrated in both loaded and unloaded conditions.
Figure 6A:
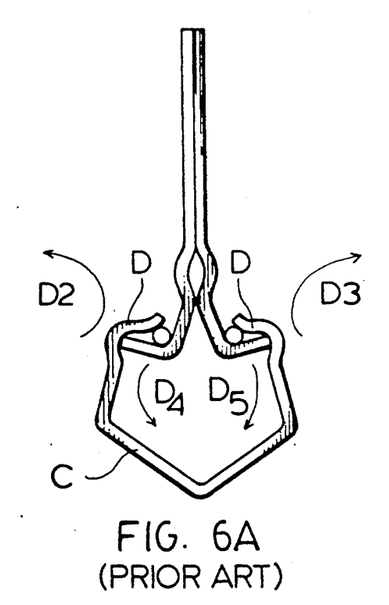

Referring now to FIG. 6 and 6a a well known track in the prior art is described with the profiles thereof. Testing of this track and comparing it to the load shedding ability of the instant invention resulted in a loading of approximately 4700 lbs vertical, load. The materials were the same 2 mm thick material and in this case steel. It was found that the fixed rail tended to open up and separate as clearly seen in FIG. 6a. If a load beyond the 4700 lb maximum ability of the track were applied the flange portions D would continue to open and thus allowing separation of the track portions B and A from the fixed portion C.

Referring now to FIG. 5, we find a deformed cross-section of the track assembly taken proximate the end E1 when subjected to a peeling load. As can be readily seen by the components of 35 the peeling load F1 a tendency to capture the outwardly extending portions 28 and 29 between the collapsing substantially J-shaped portions 32a and 32 for portion 28 and 33 and 33a for portion 29.

In considering the dynamics of the situation as the force F1 is applied from a seat belt anchor because of the preferred 45° angle of inclination of elements 32a and 33a respectively any resulting forces resolved on the ball bearing 30b will pass through the center thereof and prevent substantial movement of the ball bearing during the loading of the track. The ball bearing therefore assists and acts as structural member and passes a load from the upper track to the lower track in part when the load is in an upward direction, the portions 32a and 33a moving in an upward direction plus attempting to squeeze the ball bearing the sides 23, 24, 25 and 22 exerting an equal and opposite force resulting in the bending of portions 32a and 33a as shown in FIG. 5. The greater the force the greater the bending until such time as surface 29a and 28a are engaged by the end of portions 32b and 33b. These portions will therefore bind into the surfaces 28a and 29a and capture portions 28 and 29 therebetween. Continued application of a force F1 will cause components 32 and 33 to be drawn up toward the opening 20b, thus increasing the amount of capturing of elements 28 and 29. Thus, unlike those track structures found in the prior art presented by FIG. 6 and 6a the invention intends to interlock and provide a structural track which has a greater capacity to withstand a load from seat belts. Having this greater capacity improves the safety of the structure while permitting the use of a smaller gauge material when forming the structure. The relationship between the angle of extension of 32b and 33b from 32a and 33a has been found to be preferably greater than or equal to 90°. At an angle greater than 90° the end of components 32b and 33b will bind into the metal at an oblique angle to the surface 28a and 29a respectively. At an angle of less than 90° there may be a tendency for this portion to start to bend as well and collapse and not promote as effectively the capturing effect of the portions 28 and 29. The bending tends to be localized at points P1 and P2 as shown in FIG. 5 in the direction D1 and D2 unlike the structures found in FIGS. 6 and 6a where the flanges D tend to move in the direction D2 and D3 while the flanges of the J structure tend to move in a direction D4 and D5 thus defeating any interlocking ability whatsoever in reducing the load bearing capacity of the structure when compared to the invention at hand.

The presence of the ball bearing or any hardened abutting surface is an advantage to the working of the invention. The inclusion of the cylindrical bearing surface is preferred to be manufactured from nylon but any resilient material will do. The track may be formed from a rolling process known in the art which is easy to manufacture to keep the costs and economies of scale in line. Further, by providing such a superior profile the track and the interlocking thereof a structural track may be made from a thinner gauge material and still yet meet the requirements of the safety standards set out above.

Figure 7:
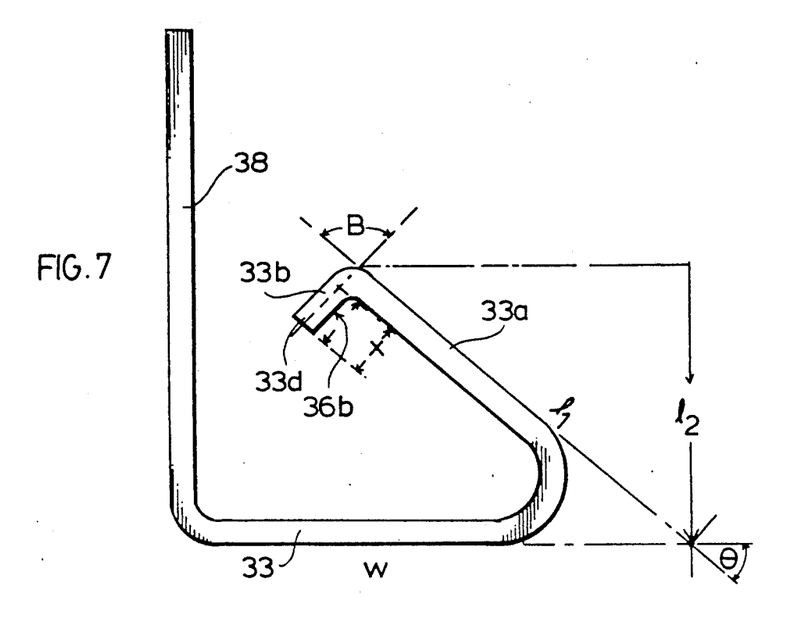
FIG. 7 is a schematic view of the geometry of the moveable track illustrated in a preferred embodiment of the invention.
Figure 7A:
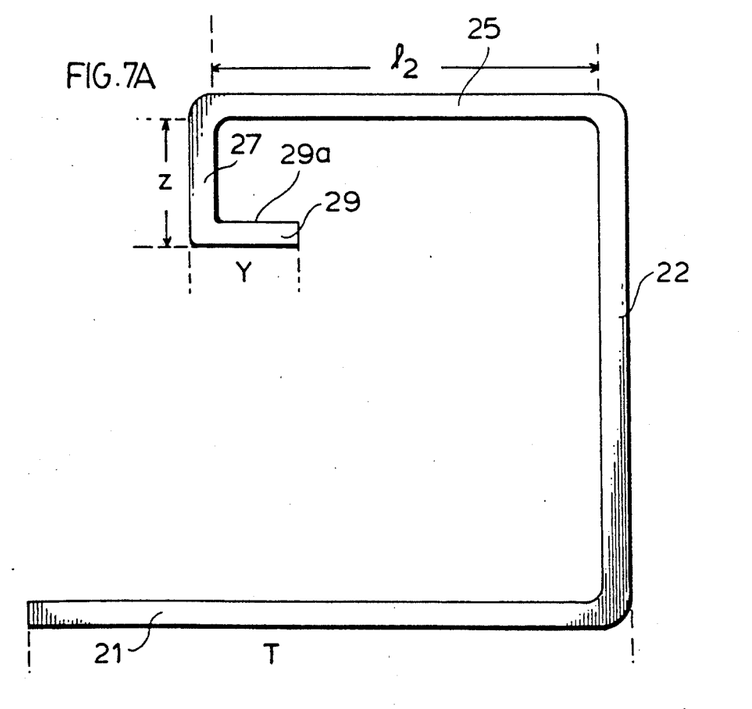
FIG. 7a is a schematic view of the geometry of the stationary track illustrated in a preferred embodiment of the invention.

Referring now to FIGS. 7 and 7a, there is described the profiles of each of the upper and lower tracks respectively in 7 and 7a to explain the geometry of the structure. Angle theta which is the angle at which portion 33a is disposed to portion 33 must be set at an angle to ensure the proper operation of the structural track when loaded. It is an important element of the track that the angle theta be selected so that the ball bearing will have minimum movement during normal and abnormal loading as best seen in FIGS. 3 and 5 and that the forces will be resolved as close as possible to the center of gravity of the ball bearing. This will ensure that the ball bearing has minimum slippage. It has been found that theta should be as closest to 45° as possible. Angle beta is established as an oblique angle in order to ensure that as the portion 33a moves towards the portion 33 during abnormal loading, that the end portion 33d will bind into the material of 33 at an angle greater than 90°. During the course of experimentation it has been found that the angle beta should be greater than 90° to work most effectively. It is possible to make the lengths of W and L1, L2, Z, Y, and X proportional to one another depending on the size of the installation. Obviously the smaller the installation the more effect of economy of scale there is in manufacturing such a track. Applicant has in the preferred embodiment formed the following dimensions when related to FIGS. 7 and 7a:

Theta substantially equal to 45°,
beta is substantially equal to 110°,
L1 is equal to 18.8 mm,
L3 is equal to 12.1 mm and L2 is equal to 13.2 mm,
Y is equal to 4 mm,
X is equal to 5 mm,
Z is equal to 7 mm,
and 2T is equal to 40.5 mm.

The above dimensions are in a preferred embodiment of the invention. Other preferred embodiments of the invention will vary the dimensions but the proportions may remain substantially the same.

If the ball bearing were changed or substituted with a cylindrical slug, for example, the angle theta would be defined as the angle which would resolve the forces through the roller when loaded or if force F1 were a peeling load through the center of gravity of that cylindrical slug. The stops disposed on the portions 30 and 20 prevent the ball bearing or roller from being squeezed out the side of the track assembly 10.

Angle beta would preferably be defined so that it will allow the lower track to unwind itself when subjected to such a load and from the grip of the upper track before the material of the lower track approaches its yield point and tears. Angle theta is further defined to allow the ball bearing assembly which takes up excessive play between the two tracks to move freely between the contact surfaces of the upper and lower moveable and fixed tracks respectively. It is important that the angle be defined to not allow any binding of the tracks whatsoever. In conclusion therefore all of the variables defined in FIG. 7 and 7a should fall within the scope of the initial objective set out above and to structurally resist a predetermined load F1 imposed upon the track assembly 10 as required by the minimum safety standards. This objective is met, therefore in using the invention with the least amount of material and when roll formed at a reasonable level of manufacturing. This will result in the most efficient design possible using the present invention.

During the collapse of the moveable track around the portions of the stationary track any energy is absorbed in the track assembly 10. Further energy will be absorbed by the continued pulling of the upper track which would eventually allow for the track assemblies separation when the moveable track progressively releases the fixed track portions 29 and 28.

Any profile including the capturing of a portion of the moveable track when subjected to a structural load would constitute application of this invention. Although profiles of such alternatives have not been assessed, the invention resides in the structural design of the track and interrelationship between the moveable and the stationary portions of the track assembly. Thus, if a portion of the moveable track collapses around a portion of the stationary track, such a track assembly would fall into the subject matter of the present invention. The preferred 5 embodiment is only provided as an illustration of the principles of the present invention without limiting the scope or nature of the present invention.

As many changes can be made to the preferred embodiment of the invention without departing from the scope thereof; all matter contained herein is to be considered illustrative of the invention and not in a limiting sense.

I claim:

1. A track assembly comprising a fixed track having two sides a top and a bottom engaged with a moveable track slidable with respect to the fixed track, the moveable track having two sides a top and a bottom and having disposed therewith anchoring means for securing a passenger to the moveable track, the fixed track having first and second portions engaging and being substantially U-shaped in cross-section, the fixed track having substantially inwardly extending second engaging portions disposed proximate the tops of the U-shaped fixed track extending inwardly towards one another and having a disposed proximate the terminus of each inwardly extending second engaging portion a substantially downwardly extending portion extending towards the bottom of the track and having disposed proximate the terminus of each downwardly extending portion first engaging portions extending towards each side of the fixed track in a direction away from one another and laterally towards the moveable track proximate the opening of the U-shaped cross-section, the moveable track having a top, bottom and sides and being of substantially double J form in cross-section, one of the J structures being a mirror image of the other, each J structure having a larger leg extending from proximate the bottom to proximate the top of the moveable track, and angled smaller leg extending substantially from proximate the bottom toward the top of the moveable track, wherein the smaller leg having disposed proximate the terminus thereof remote from the bottom of the J structure a third engaging portion disposed in a direction extending inwardly and then downwardly towards each larger leg of the double J form terminating with a hooking portion, each third portion being an extension of the smaller leg extending towards the larger leg, the bottom of each J structure providing a fourth engaging portion, the third and fourth engaging portions for interengagement with each first engaging portion of the U-shaped fixed track disposed substantially between each third and fourth engaging portions of the double J form moveable track in use, each fist and second engaging portion of the fixed track for interengagement with each third engaging portion of the moveable track disposed substantially between each first and second engaging portions of the fixed track in use; whereby when a force is exerted upon the track assembly through the anchor means in a direction tending to separate the tracks, the second engaging portions of the fixed track will engage the third engaging portions of the moveable track causing the third engaging portions to collapse towards the fourth engaging portions thus interlocking the first engaging portions therebetween and resisting the force tending to seperate the tracks, wherein bearing means is disposed between the fixed and moveable track between each second and third portions of the track assembly to assist in the collapse of the third portions toward the fourth portions when the track assembly is subjected to a force tending to separate the track assembly, normally the bearing means assisting movement of the moveable track engaged with the fixed track.

2. The track assembly of claim 1, wherein the bearing means is retained between the fixed and moveable tracks by cooperative stop means disposed with the moveable and fixed track.

3. The track assembly of claim 2, wherein the stop means further comprises raised portions integrally formed with the moveable and(/or) fixed track.

4. The track assembly of claim 1 or 2, wherein the bearing means further comprises nylon rod disposed between ball bearings.

5. The track assembly of claim 1 wherein the fixed and moveable track are formed by conventional roll forming techniques.

6. The track assembly of claim 1 further comprising third portions having hooking portions disposed at the end thereof proximate the first portions, the hooking portions extending towards the first portions and for binding into the first portions when the third portion collapses towards the fourth portions when subjected to a force tending to separate the track assembly.

7. The track assembly of claim 2 or 3 further comprising third portions having hooking portions disposed at the end thereof proximate the first portions, the hooking portions extending towards the first portions and for binding into the first portions when the third portion collapses towards the fourth portions when subjected to a force tending to separate the track assembly.

8. The track assembly of claim 6, wherein the third portion is disposed at a substantially 45° angle to the extension of the fourth portion.

9. The track assembly of claim 7, wherein the third portion is disposed at a substantially 45° angle to the extension of the fourth portion.

10. The track assembly of claim 6, wherein the hooking portions are disposed at an angle greater than substantially 90° to the extension of the third portion.

11. The track assembly of claim 7, wherein the hooking portions are disposed at an angle greater than substantially 90° to the extension of the third portion.

12. The track assembly of claim 8, wherein the hooking portions are disposed at an angle greater than substantially 90° to the extension of the third portion.

13. The track assembly of claim 1 further comprising resilient insert means extending longitudinally within the fixed track.

14. The track assembly of claim 13, wherein the resilient insert means further comprises openings in which roller means are contained to assist the movement of the moveable rail within the fixed rail.

15. The track assembly of claim 14, wherein the roller means is at least one cylindrical roller.

16. The track assembly of claim 13, wherein the resilient insert means is made from acetal sheet.

17. The track assembly of claim 14, wherein the resilient insert means is made from acetal sheet.

18. The track assembly of claim 15, wherein the resilient insert means is made from acetal sheet.

19. A track assembly comprising a fixed track having two sides a top and a bottom engaged with a moveable track slidable with respect to the fixed track, the moveable track having two sides a top and a bottom and having disposed therewith anchoring means for securing a passenger to the moveable track, the fixed track having first and second portions, a pair of substantially inwardly extending second engaging portions are disposed proximate the tops of fixed track extending inwardly towards one another and having disposed proximate the terminus of each inwardly extending second portion a substantially downwardly extending portion extending towards the bottom of the track and having disposed proximate the terminus of each downwardly extending portion first engaging portions extending towards each side of the fixed track in a direction away from one another and laterally towards the moveable track, the moveable track having a top, bottom and sides and being of substantially double form in cross-section, one of the form structures being a mirror image of the other, each structure having an angled smaller leg extending substantially from proximate the bottom towards the top of the moveable track, the smaller leg having disposed proximate the terminus thereof remote the bottom of the double form a third engaging portion disposed in a direction extending inwardly and then downwardly towards the mirror image of the double form terminating with a hooking portion, each third engaging portion being an extension of the smaller leg extending towards the mirror image thereof, the bottom of each form structure providing a fourth engaging portion, the third and fourth engaging portions for interengagement with each first engaging portion of the fixed track disposed substantially between each third and fourth engaging portions of the double form shaped moveable track in use, each first and second engaging portion of the fixed track for interengagement with each third engaging portion of the moveable track disposed substantially between each first and second engaging portions of the fixed track in use; whereby when a force is exerted upon the track assembly through the anchor means in a direction tending to separate the tracks, the second engaging portions of the fixed track will engage the third engaging portions of the moveable track causing the third engaging portions to collapse towards the fourth engaging portions thus interlocking the first engaging portions therebetween and resisting the force tending to separate the tracks, wherein bearing means is disposed between the fixed and moveable track between each second and third portions of the track assembly to assist in the collapse of the third portions toward the fourth portions when the track assembly is subjected to a force tending to separate the track assembly, normally the bearing means assisting movement of the moveable track engaged with the fixed track.

20. The track assembly of claim 19, wherein the bearing means is retained between the fixed and moveable tracks by cooperative stop means disposed with the moveable and/or fixed track.

21. The track assembly of claim 20, wherein the stop means further comprises raised portions integrally formed with the moveable and/or fixed track.

22. The track assembly of claim 20 or 21 wherein the bearing means further comprises nylon rod disposed between ball bearings.

* * * * *